United States Patent [19]

Maeda et al.

[11] Patent Number: 4,687,641

[45] Date of Patent: * Aug. 18, 1987

[54] APPARATUS FOR PREPARING PRE-EXPANDED THERMOPLASTIC RESINS

[75] Inventors: Hirofumi Maeda, Takatsuki; Kyoichi Nakamura, Osaka; Hisatoshi Fukui, Toyonaka, all of Japan

[73] Assignee: Kanegafuchi Kogaku Kogyo Kabushiki Kaisha, Osaka, Japan

[*] Notice: The portion of the term of this patent subsequent to Aug. 11, 2004 has been disclaimed.

[21] Appl. No.: 720,820

[22] Filed: Apr. 8, 1985

Related U.S. Application Data

[62] Division of Ser. No. 647,659, Sep. 6, 1984, Pat. No. 4,525,485.

[30] Foreign Application Priority Data

Sep. 8, 1983 [JP] Japan ................................. 58-166144
Sep. 8, 1983 [JP] Japan ................................. 58-166145

[51] Int. Cl.$^4$ ........................... C08J 9/18; B01J 10/00
[52] U.S. Cl. .................................. 422/133; 422/112; 422/113; 422/131; 521/60
[58] Field of Search ............... 422/130, 131, 133, 234, 422/116; 432/13; 521/56–60; 209/172, 173; 210/523, 525

[56] References Cited

U.S. PATENT DOCUMENTS

| 1,548,971 | 8/1925 | Ziska, Jr. | 209/173 |
| 3,743,694 | 7/1973 | Cichelli et al. | 521/60 |
| 4,063,565 | 12/1977 | Edwards et al. | 209/173 |
| 4,448,901 | 5/1984 | Senda et al. | 521/58 |

FOREIGN PATENT DOCUMENTS 59-33123 2/1984 Japan ..................... 521/60

Primary Examiner—Michael S. Marcus
Attorney, Agent, or Firm—Antonelli, Terry & Wands

[57] ABSTRACT

A process and apparatus for preparing pre-expanded particles of a thermoplastic resin which comprises; heating under an elevated pressure an aqueous dispersion comprising thermoplastic resin particles containing a volatile foaming agent and an aqueous medium in a pressure vessel; releasing the dispersion from the pressure vessel into a space within a sealed low-pressure vessel wherein the pressure is lower than that in the pressure vessel, whereby expanding the thermoplastic resin particles to give pre-expanded particles; and simultaneously recovering the foaming agent volatilized from the thermoplastic resin particles by discharging the foaming agent out of the space in the low-pressure vessel with controlling the pressure in the low-pressure vessel to substantially a given pressure. According to the process, the release of the volatile foaming agent into the air is prevented.

5 Claims, 5 Drawing Figures

APPARATUS FOR PREPARING PRE-EXPANDED THERMOPLASTIC RESINS

This is a division of application Ser. No. 647,659, filed Sept. 6, 1984, now U.S. Pat. No. 4,525,485.

BACKGROUND OF THE INVENTION

The present invention relates to a process for preparing pre-expanded particles of a thermoplastic resin and apparatuses used in the process. More particularly, the present invention relates, in preparing the pre-expanded particles where thermoplastic resin particles containing a volatile foaming agent which are dispersed in water under heating and an elevated pressure are released into a low-pressure area, to a process for recovering the foaming agent volatilized from the particles released into the low-pressure area; to a process for taking the pre-expanded particles out of the system with recovering the foaming agent; and to apparatuses used in the process.

Up to now a process for preparing pre-expanded particles of a thermoplastic resin where foaming agent containing particles are released into a low-pressure area after they are dispersed in water in a pressure vessel, for example, autoclave, and stirred under high prerssure and high temperature is known as described in GE-OS (Offenlegungsschrift) No. 2,107,683, Japanese Patent Examined Publication No. 56-1344 and so on.

A description referring to preparing pre-expanded particles of a thermoplastic resin is indicated in the above-mentioned publications. However, any description referring to processes for recovering the foaming agent and to apparatuses applied to the processes in preparing pre-expanded particles in industrial scale is not indicated. The foaming agent generated in preparing pre-expanded particles is released into the air without recovery. As a result, that causes problems such as air pollution and the worsening of working environment, and economical problems such as increase in the material cost.

SUMMARY OF THE INVENTION

It is an object of the present invention to provide a process for recovering the volatile foaming agent generated in preparing pre-expanded particles of a thermoplastic resin.

The other object of the present invention is to provide a process for taking pre-expanded particles out of the system, simultaneously with recovering the volatile foaming agent in preparing pre-expanded particles of a thermoplastic resin.

Another object of the present invention is to provide an apparatus for taking pre-expanded particles out of the system simultaneously with recovering the volatile foaming agent.

These and other objects of the present invention will become apparent from the description hereinafter.

The present invention provides a process for preparing pre-expanded particles of a thermoplastic resin which comprises; heating under an elevated pressure an aqueous dispersion comprising thermoplastic resin particles containing a volatile foaming agent and an aqueous medium in a pressure vessel; releasing the dispersion from the pressure vessel into a space within a sealed low-pressure vessel wherein the pressure is lower than that in the pressure vessel, whereby expanding the thermoplastic resin particles to give pre-expanded particles; and simultaneously recovering the foaming agent volatilized from the thermoplastic resin particles by discharging the foaming agent out of the space in the low-pressure vessel with controlling the pressure in the low-pressure vessel to substantially a given pressure.

The above-mentioned process of the present invention has a noticeable effect to prevent releasing the foaming agent into the air which causes air pollution, the worsening of working environment and increase in the material cost, because the foaming agent volatilized from the thermoplastic resin particles which are released into the space within the sealed low-pressure vessel where the pressure is kept to a given pressure is discharged from the space within the low-pressure vessel and recovered.

Furthermore the present invention provides a process for preparing pre-expanded particles of a thermoplastic resin which comprises; heating under an elevated pressure an aqueous dispersion comprising thermoplastic resin particles containing a volatile foaming agent and an aqueous medium in a pressure vessel; releasing the dispersion from the pressure vessel into a space within a sealed low-pressure vessel wherein the pressure is lower than that in the pressure vessel and the space is sealed with an aqueous medium which exists in the lower portion of the vessel and communicates with the outside of the vessel, whereby expanding the thermoplastic resin particles to give pre-expanded particles; and sinking the resulting pre-expanded particles under the aqueous medium by a pushing plate which are movable up and down along the inner surface of the separation wall of the low-pressure vessel so that the pre-expanded particles are taken out of the low-pressure vessel through the aqueous medium which communicates with the outside of the vessel, while recovering the foaming agent volatilized from the thermoplastic resin particles by discharging the foaming agent out of the space in the low-pressure vessel with controlling the pressure in the low-pressure vessel to substantially a given pressure.

Moreover the present invention provides an apparatus for preparing pre-expanded particles of a thermoplastic resin which comprises: a pressure vessel for heating under an elevated pressure an aqueous dispersion comprising thermoplastic resin particles containing a volatile foaming agent and an aqueous medium; a release line the one end of which communicates with the pressure vessel and which is provided with a release outlet at the other end thereof; a low-pressure vessel in which the thermoplastic resin particles containing the volatile foaming agent in the aqueous dispersion released thereinto through the release outlet is pre-expanded and the volatile foaming agent contained in the particles is volatilized, the space in the low-pressure vessel being sealed with an aqueous medium which exists in the lower portion of the vessel and communicates with the outside of the vessel; a means for discharging the volatilized foaming agent from the low-pressure vessel and recovering it with controlling the inner pressure of the low-pressure vessel to substantially a given pressure; and a means for sinking the pre-expanded particles under the aqueous medium in the low-pressure vessel to take them out of the vessel through the aqueous medium which communicates with the outside of the vessel, the means comprising a pushing plate which is movable up and down along the inner surface of the separation wall of the low-pressure vessel.

The above-mentioned process and apparatus in accordance with the present invention have noticeable effects that releasing foaming agent in the air which causes air pollution, the worsening of working environment and increase in material cost can be prevented by discharging the foaming agent volatilized from the thermoplastic resin particles which are released into the space in the low-pressure vessel where the pressure is kept to a given pressure through a part of the space in the vessel and recovering it, and that the low-pressure vessel can be made smaller by sealing the low-pressure vessel with the aqueous medium which communicates with the outside of the vessel, sinking the pre-expanded particles under the aqueous medium to take them out of the vessel successively, which results in decrease in the equipment cost and increase in recovery rate of foaming agent, and that extraneous matters on the surface of the pre-expanded particles can be removed because the particles are sunk under the aqueous medium before taking out them.

DETAILED DESCRIPTION

Figure 1:
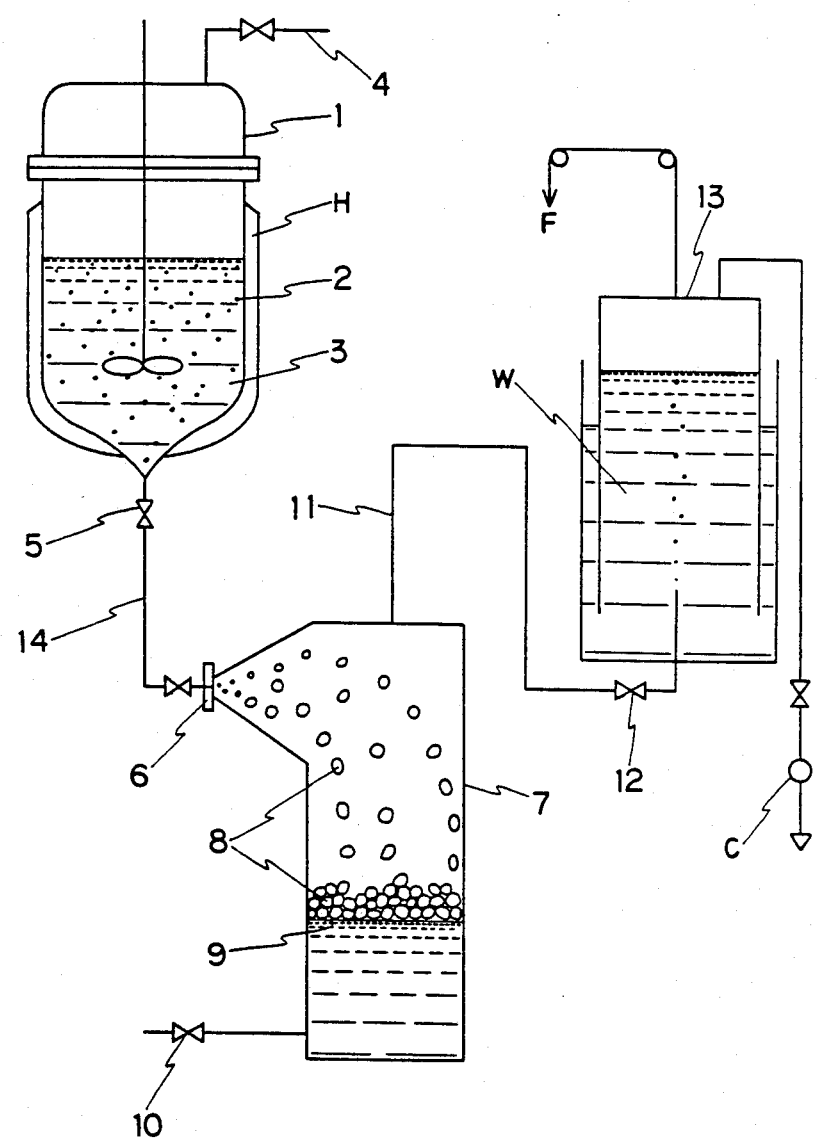
FIG. 1 is a schematic view showing an embodiment of an apparatus in accordance with the present invention.

Thermoplastic resins used in the present invention are not limited, if they can contain a volatile foaming agent and obtain a visco-elasticity suitable to expand when they are heated. Examples of the thermoplastic resin are styrene polymers such as polystyrene, high impact polystyrene, poly-α-methylstyrene, styrenemaleic anhydride copolymer, blend polymer of polyphenylene oxide and polystyrene, styrene-grafting polyphenylene oxide, styrene-acrylonitrile copolymer, acrylonitrile-butadiene-styrene terpolymer and styrene-butadiene copolymer; olefin polymers such as low density polyethylene, linear low density polyethylene, medium density polyethylene, high density polyethylene, polypropylene, ethylene-propylene copolymer, ethylene-vinyl acetate copolymer and ethylene-methyl methacrylate copolymer; vinyl chloride polymers; and methyl methacrylate polymers. Those thermoplastic resins can be used alone or as blends of two or more kinds thereof. Olefin polymers can be used as they are and those cross-linked with peroxide or by radiation can be also used.

In the present invention, the above-mentioned thermoplastic resins are used in the form of particle. The particles are prepared by usual manners such as suspension polymerization, and pulverization or cutting of pellet sheets or sticks made by means of extruder, calender roll or the like. The particles can be used in any forms, e.g., sphere, ellipsoid, cylinder, cube and rectangular prism. However, it is preferred that the particles are uniform in size in order to obtain uniform pre-expanded particles. The particles used for preparing pre-expanded particles for foaming within a mold are preferably in the form of sphere having a diameter of about 0.5 mm. to about 6 mm.

The volatile foaming agent (hereinafter simply referred to as "foaming agent") used in the present invention includes hydrocarbons, halogenated hydrocarbons, and the like, which have a boiling point of from $-50°$ C. to $100°$ C. Examples of the foaming agent are propane, butane, pentane, hexane, heptane, cyclopentane, cyclohexane, monochloromethane, dichloromethane, monochloroethane, trichloromonofluoromethane, dichlorodifluoromethane, dichloromonofluoromethane, trichlorotrifluoroethane and dichlorotetrafluoroethane. Those foaming agents can be used alone or as admixtures of two or more kinds thereof.

In the present invention, particles of a thermoplastic resin are impregnated with the foaming agent. The method for impregnating thermoplastic resin particles with a foaming agent includes a method where a foaming agent and thermoplastic resin particles are dispersed into water in a pressure vessel and heated under an elevated pressure, and the like. In that case, the foaming agent is used in an amount of 2 to 50 parts (parts by weight, hereinafter the same), preferably 5 to 40 parts, per 100 parts of the particles used. When the amount of the foaming agent is less than 2 parts, the recovery has no economical importance. When the amount of the foaming agent is more than 50 parts, the pressure is over the limit sufficient to impregnate the resin particles with the foaming agent, which results in waste of the foaming agent.

Th thermoplastic resin particles impregnated with the foaming agent (hereinafter simply referred to as "foaming agent containing particles") obtained in the above manner are dispersed into water. It is preferable that the dispersing of the foaming agent containing particles in water is carried out in a pressure vessel, because the particles are prepared usually in the manner mentioned above. In that case, it is preferable that a small amount of dispersing agent is used to prevent adhesion between the particles during heating. Examples of the dispersing agent used for the purpose are water-soluble polymers such as polyvinyl alcohol, methyl cellulose and N-polyvinyl pyrrolidone, inorganic substances being slightly soluble in water such as calcium phosphate, magnesium pyrophosphate and zinc carbonate, combinations of the foregoing inorganic substances and a small amount of anionic surface active agents such as sodium dodecylbenzenesulfonate and sodium α-olefinsulfonate, and the like.

The foaming agent containing particles are used in an amount of 15 to 100 parts, preferably 25 to 70 parts, per 100 parts of water. When the amount of the particles is less than 15 parts, the productivity is lowered and the energy cost is increased. When the amount of the particles is more than 100 parts, adhesion between the particles is invited easily.

A pressure is applied to the aqueous dispersion thus obtained in the pressure vessel so that the pressure becomes 5 to 50 kg./cm.$^2$ G, preferably 10 to 40 kg./cm.$^2$ G after heating, and the dispersion is heated with agitating. The pressure under 5 kg./cm.$^2$ G needs long time for releasing the dispersion and that over 50 kg./cm.$^2$ G invites increase of the cost of the pressure vessel. The heating level varies depending on the melt index (MI) of the resin used, etc. Usually the aqueous dispersion is heated until the temperature overpasses the softening point of the resin and thereafter is kept at the same temperature.

The aqueous dispersion heated under an elevated pressure is released into a low pressure vessel, with introducing nitrogen gas, foaming agent, or the like into the pressure vessel in order to keep a given high pressure in the pressure vessel during releasing the dispersion. The aqueous dispersion is released into a space in the low-pressure vessel which is sealed under a give pressure lower than that in the pressure vessel through a release outlet such as orifice plate or nozzle which is provided at the other end of a release line communicating with the inside of the pressure vessel. The foaming agent containing particles released into the low-pressure vessel are expanded because the foaming agent contained in the particles is volatilized due to decrease in pressure.

In the present invention, the volatilized foaming agent is discharged from the space in the low-pressure vessel with controlling the pressure in the low-pressure vessel to a given pressure, and recovered through a recovery line. The foaming agent may be discharged by means of, for example, the increase in pressure in the low-pressure vessel due to the release of the aqueous dispersion, suctioning with a pump, or the like. Usually, in that case, the pressure in the low-pressure vessel is controlled so that it is substantially constant during the pre-expansion operation in order to obtain pre-expanded particles having a given constant pre-expansion ratio. The term "constant pressure" used in the invention is intended to mean that some deviation from an exact constant value is allowable. However, the pressure in the low-pressure vessel may be controlled so that it is increased or decreased with the lapse of time, when it is desired that the pre-expansion ratio varies during the pre-expansion operation.

The manner for controlling the pressure in the low-pressure vessel to a given pressure includes a manner wherein the pressure in the low-pressure vessel sealed with water is automatically regulated by using a pressure sensor, a pump and a microcomputer, a manner wherein a valve means which opens automatically when the pressure in the low-pressure vessel overpasses a given pressure is provided in a foaming agent recovery line, and the like.

Most of the water or aqueous solution released with the foaming agent containing particles is accumulated in liquid phase in the lower part of the low-pressure vessel. The liquid can be discharged out of the vessel by operating a valve provided at the lower part of the low-pressure vessel or through an overflow outlet which is provided near the surface of water in the outside of the vessel which communicates with the inside of the vessel. Furthermore fresh water can be supplied into the low-pressure vessel to wash extraneous matter away from the surface of the pre-expanded particles. The pre-expanded particles are accumulated on the liquid in the low-pressure vessel.

The foaming agent discharged from the low-pressure vessel is usually led to equipments used for refining, separating or collecting gases. The foaming agent thus recovered in a gaseous state may be used as a starting material for next pre-expansion procedure or stored after liquefied by means of a compressor, a condenser, or the like.

Now referring to FIG. 1, the present invention is described regarding a process and an apparatus for recovering foaming agent.

In FIG. 1, 1 shows a pressure vessel such as autoclave. The vessel 1 is provided with a gas line 4 with a valve for keeping the inner pressure of the vessel 1 to a high pressure; a stirrer for stirring an aqueous dispersion comprising foaming agent containing particles 2 and an aqueous solution 3; a heater H for heating the aqueous dispersion; and a valve 5 for releasing the aqueous dispersion.

An aqueous dispersion is prepared by mixing foaming agent containing particles 2 and an aqueous solution 3 in the pressure vessel 1. After pressurized through the gas line 4, if necessary, the aqueous dispersion is heated while stirred, so that it could be under a given condition in pressure and temperature. The aqueous dispersion under the given condition in pressure and temperature is led from the pressure vessel 1 to a release outlet 6 which is provided at the one end of a release line 14 connected to the lower part of the pressure vessel, through the release line 14 by opening the valve 5.

The release outlet 6 communicates with the inside of a sealed low-pressure vessel 7 through a trumpet-shaped coupling which widens toward the end. The aqueous dispersion led to the outlet 6 is released into the low-pressure vessel 7 through the coupling.

The foaming agent contained in the particles 2 in the aqueous dispersion released into the low-pressure vessel 7 volatilizes due to change in pressure, whereby the particles 2 which are heated over the softening point are expanded. The pre-expanded particles 8 thus formed fall in the low-pressure vessel 7, while the volatilized foaming agent is discharged from a line 11 through a valve 12 so that the pressure in the low-pressure vessel 7 is kept to a given pressure. In that case, a Nash Hytor pump or the like can be used for suction. After water vapour contained in the discharged foaming agent is absorbed in water, the discharged foaming agent is collected in a collector 13.

The collector 13 shown in FIG. 1 has a shape like an inverted bowl and is full of water W. The water is replaced with the foaming agent, whereby the foaming agent is collected in the collector 13. Such a collector is merely an example. Collectors which are usually employed to collect gas can be also used. In the case of the collector 13 shown in FIG. 1, the pressure in the collector 13 can be regulated by changing the water level in it. When the pressure in the collector 13 is regualted in such a manner, the amount of the foaming agent discharged from the vessel 7 can be controlled without using a pump or other means to discharge the foaming agent from the vessel 7.

When the vessel 7 is filled with the pre-expanded particles and the aqueous solution to such an extent that the release of the aqueous dispersion and expansion of the particles are hindered, water level 9 in the vessel 7 can be lowered by discharging the aqueous solution through a valve 10. It is preferable that the space of the vessel 7 is as small as possible from the viewpoints of recovery of foaming agent and the cost of equipment.

Figure 2:
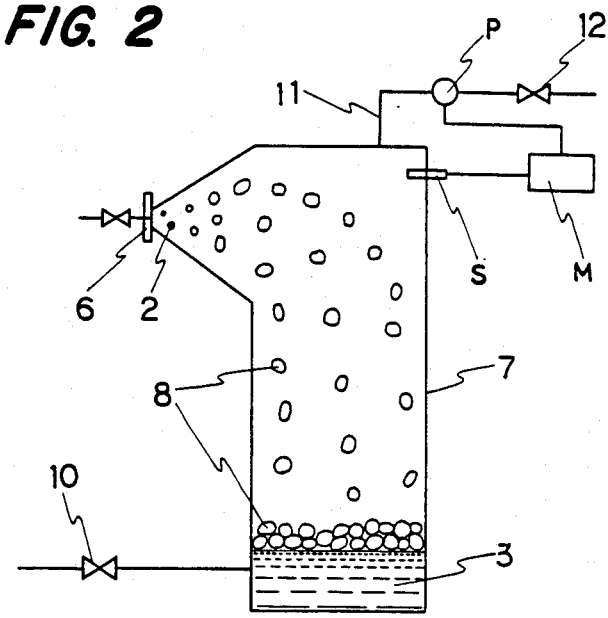
FIG. 2 is a schematic view showing another example of the low-pressure vessel section in the apparatus of FIG. 1.

FIG. 2 shows another embodiment of the vessel 7. The vessel 7 shown in FIG. 2 is provided with a prsssure sensor S which is connected with a microcomputer M and the microcomputer M controls a pump P so that the pressure in the vessel 7 might be kept to a set constant pressure. The foaming agent is led to the collector 13 through the line 11 and the valve 12 by the pump P.

Figure 3:
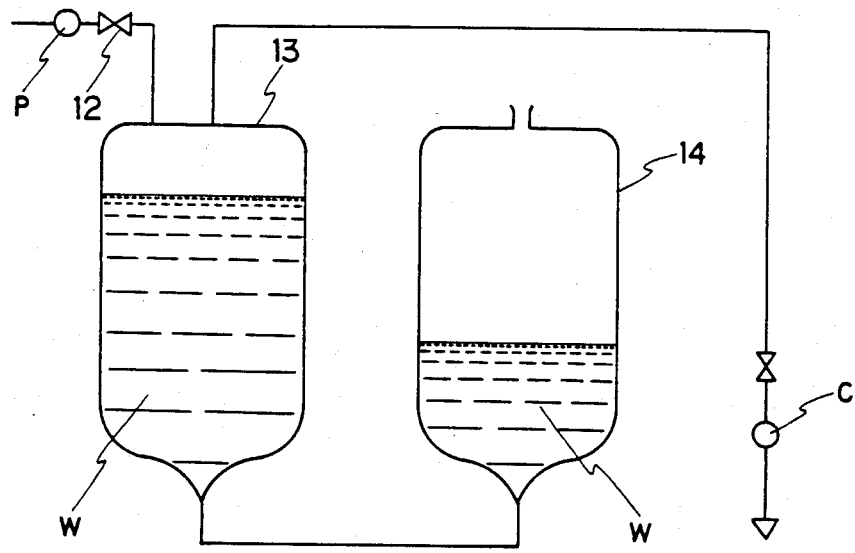
FIG. 3 is a schematic view showing another example of the section of recovering the foaming agent in the apparatus of FIG. 1.

Various types of collectors can be used for collecting the foaming agent. For example, a collector having such a structure that the water level therein is moved up and down by force F for regulating the inner pressure as shown in FIG. 1 can be employed. Another example of the collector is shown in FIG. 3. The collector shown in FIG. 3 comprises a fixed vessel 13 and a water tank 14. The inner pressure of the vessel 13 is regulated by means of the difference in water pressure between the vessel 13 and the water tank 14 which is caused by leading a foaming agent to the vessel 13, whereby discharging the water in the vessel 13 to the water tank 14. In that case, the foaming agent can be compressed by a compressor C and recovered in order to regulate the inner pressure in the vessel 13.

By the above-mentioned manner, about 80% to about 95% by weight of the foaming agent used to prepare foaming agent containing particles can be recovered. Therefore release of the foaming agent into the air which causes air pollution, the worsening of working environment and increase of material cost can be almost prevented.

In accordance with the present invention, it is preferable that, as a low-pressure vessel, there is employed a vessel sealed with water which communicates with the inside and the outside of the vessel, and pre-expanded particles accumulated in the low-pressure vessel are sunk under the water by a means mentioned below to take them out of the low-pressure vessel through the water which communicates with the outside of the vessel, while the foaming agent is being recovered.

In such a manner, a small low-pressure vessel in volume is available to store pre-expanded particles, since the pre-expanded particles are taken out of the vessel successively. That leads to the low equipment cost and increase of the amount of the foaming agent recovered. Furthermore extraneous matters attached to the surface of the pre-expanded particles, for example, dispersants, can be washed away, since the pre-expanded particles are sunk under the water for sealing the low-pressure vessel before taken out of the vessel. When the sealing water is replaced with fresh water, the extraneous matters can be removed more effectively.

Next, a manner of taking the pre-expanded particles accumulated in the low-pressure vessel out of it is described.

In the present invention, the pre-expanded particles accumulated in the low-pressure vessel are sunk under water by a pushing plate which is provided in the low-pressure vessel and moves up and down along the separation wall of the low-pressure vessel which separates the water surface of the sealing water into two portions, the one exists in the low-pressure vessel and the other exists in the outside of the vessel, and the sunk particles are taken out of the vessel through the water which communicates with the outside.

Figure 4:
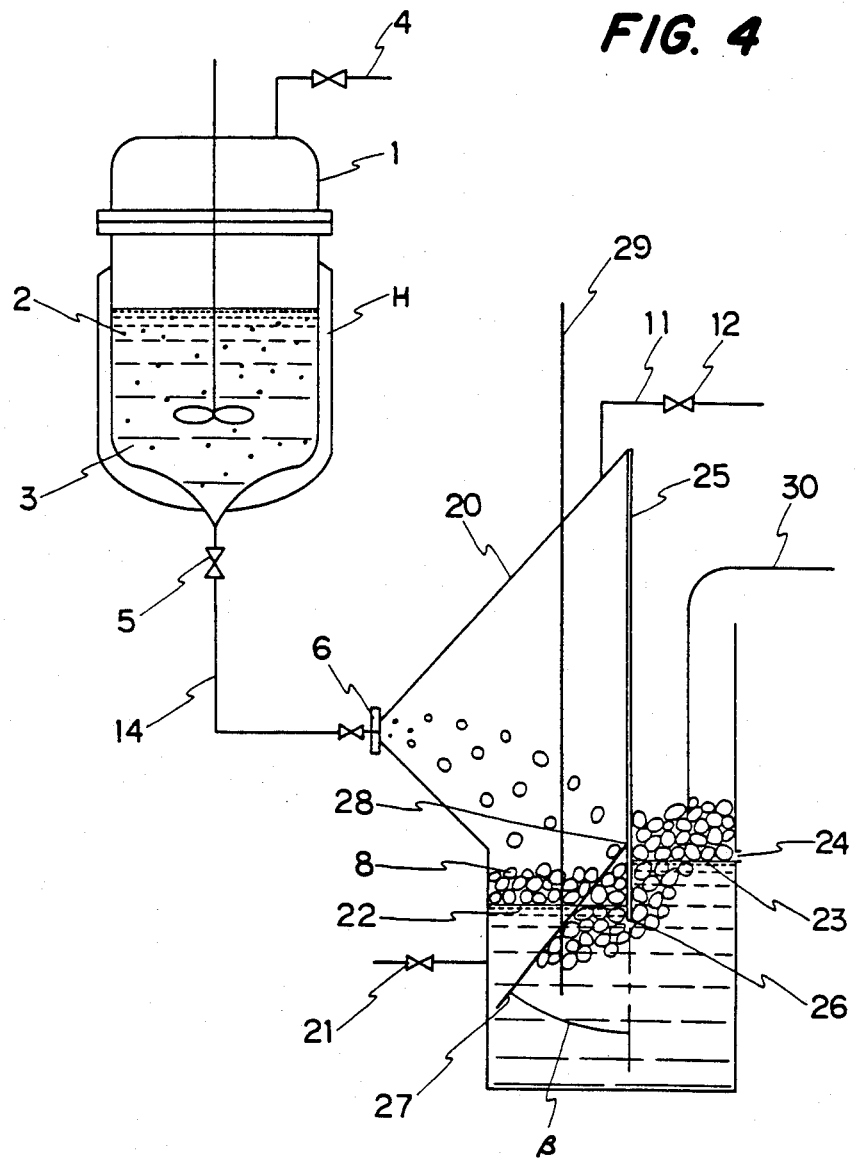
FIG. 4 is a schematic view showing another embodiment of an apparatus in accordance with the present invention.

Referring to FIG. 4, the above-mentioned process for taking the pre-expanded particles out of the low-pressure vessel and an apparatus applied to it are described.

In FIG. 4, the same elements and parts as in FIG. 1 are indicated in the same way as in FIG. 1.

An aqueous dispersion comprising foaming agent containing particles 2 and an aqueous solution 3 which is prepared in a pressure vessel 1 is led to a release outlet 6.

Through a trumpet-shaped coupling which widens toward the end of the outlet 6, the outlet 6 communicates with a sealed low-pressure vessel 20 which is sealed with water existing in the lower part of the vessel. The low-pressure vessel 20 is provided with a recovery line 11 so that the foaming agent which is generated when foaming agent containing particles are expanded might be recovered, and the pressure in the low-pressure vessel 20 could be kept to a given pressure. The inside of the low-pressure vessel 20 is communicated with its outside through the water. The low-pressure vessel 20 is also provided with a valve 21 for discharging the accumulated solution therefrom or replacing the solution with fresh water.

The aqueous dispersion under high temperature and high pressure led to the release outlet 6 is released through the outlet 6 into the space in the low-pressure vessel 20.

The foaming agent which is contained in the particles 2 in the aqueous dispersion released into the low-pressure vessel 20 volatilizes due to change in pressure, whereby the particles 2 heated over the softening point are expanded. Pre-expanded particles 8 fall in the low-pressure vessel 20, while the volatilized foaming agent is discharged from the recovery line 11 so that the pressure in the low-pressure vessel 20 could be kept to a given pressure. In that case, a Nash Hytor pump or the like can be used for suction. It may be also discharged by making difference in pressure between a collector for foaming agent and the low-pressure vessel 20. As the colletor any usual collectors can be employed. The collectors shown in FIGS. 1 and 3 are examples.

The low-pressure vessel 20 is filled more and more with pre-expanded paticles 8 and the solution 3. The amount of the solution accumulated in the vessel 20 can be regulated by operating a valve 21 and the solution can be also replaced with fresh water. An overflow outlet 24 provided near the water surface 23 of the outside of the low-pressure vessel can be also used to discharge the solution.

Pre-expanded particles 8 are taken out of the low-pressure vessel 20 by the means mentioned below, while the low-pressure vessel 20 is kept sealed and the foaming agent is recovered.

The water in the low-pressure vessel 20 seals the vessel and communicates the inside with the outside of the vessel. The vessel 20 is provided with a pushing plate which is provided in the vessel 20 and moves up and down along the separation wall 25 of the vessel 20 in order to sink pre-expanded particles 8 under the water and take them out of the vessel through the water which communicates with the outside.

In order to seal the low-pressure vessel 20 with water, the water levels 22 and 23 of the inside and outside of the low-pressure vessel respectively must be above the lower end 26 of the separation wall 25. However, too high water level 22 causes decrease in efficiency, since the volume of the space of the vessel where pre-expanded particles are accumulated becomes smaller and the depth of water which the particles should be sunk becomes deeper. Therefore, the preferable distance between the water level 22 and the lower end 26 of the separation wall is about 10 cm. to about 50 cm.

A plate having many throughholes, e.g. steel plate, which passes water but no pre-expanded particles is employed preferably as the pushing plate 27.

For example, the pushing plate 27 is set at an acute fixed angle $\beta$ with the separation wall 25 downward as shown in FIG. 4. In that case, it is necessary that the pushing plate is moved along the separation wall 25 from the upper part to the lower end 26 of the wall by means of a cylinder or other analogous means 29 so that the pre-expanded particles do not pass through the clearance between the upper end 28 of the pushing plate 27 and the separation wall 25 and the pre-expanded particles accumulated on the water surface 22 are sunk under the water and taken out. The angle $\beta$ of the pushing plate with the separation wall and the size of the pushing plate are not limited, if the pushing plate fits the purpose to sink pre-expanded particles under water and take them out. However, an angle $\beta$ of 15° to 80° is preferable. It is uneconomical to set the plate at an angle $\beta$ under 15° with the separation wall, since a big pushing plate is needed to sink most of pre-expanded particles and the distance between the lower end 26 of the separation wall 25 and the bottom of the vessel 20 must be lengthened. And in the case of the angle $\beta$ over 80°, it is inefficient to take the sunk pre-expanded particles out of the vessel by means of the pushing plate.

When the pre-expanded particles rise to the water surface 22 from the both sides of the pushing plate because of the smaller width of the pushing plate than that of the separation wall, it is preferable to set up a fence on the both sides of the pushing plate in order to take out the pre-expanded particles more effectively.

Pre-expanded particles 8 on the water surface 22 are sunk under the water by the pushing plate 27 and rise to the water surface 23 of the outside by buoyancy through the water which communicates the indside of the low-pressure vessel 20 with its outside which is usually under atmospheric pressure. The pre-expanded particles rise to the water surface 23 are taken out, for instance, by a suction pump 30 or the like.

Figure 5:
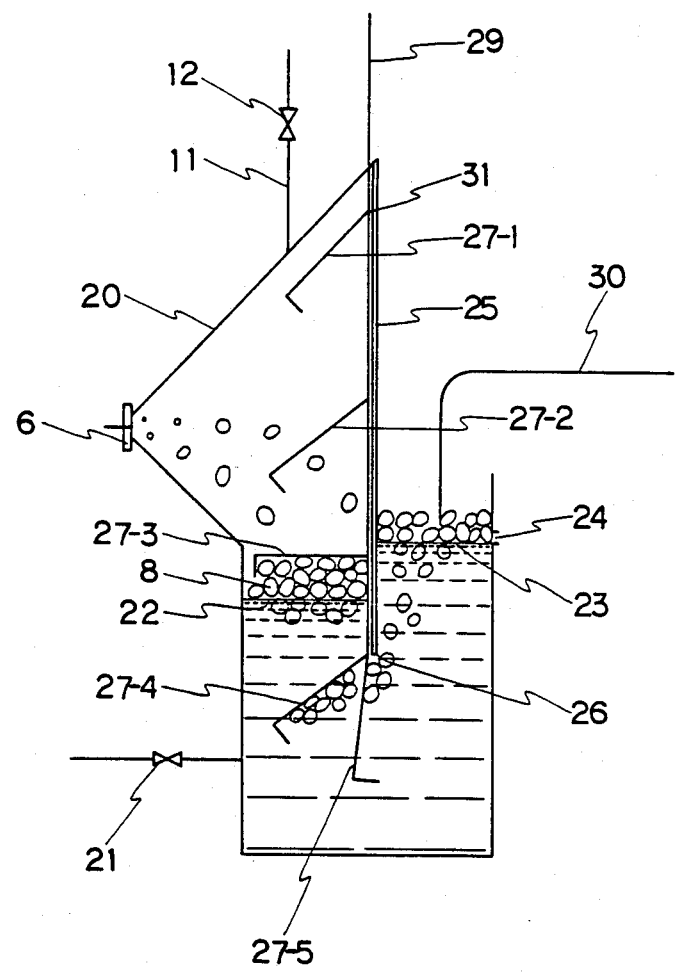
FIG. 5 is a schematic view showing another example of the low-pressure vessel section in the apparatus of FIG. 4.

FIG. 5 shows an outline of another embodiment of a means for taking out the pre-expanded particles using a pushing plate in accordance with the present invention. In this embodiment, the pushing plate 27 is arranged so that the angle of it with the separation wall is variable.

In FIG. 5, 27-1, 27-2, 27-3, 27-4 and 27-5 show the respective states of the pushing plate 27 which is moved downwards by means of a cylinder 29 or the like with lapse of time.

As shown in FIG. 5, a pushing plate 27 is constructed such that it rotates at the lower end of the cylinder about a supporting axis 31 of the cylinder 29 which moves up and down.

Going down from the state 27-1, the pushing plate 27 is horizontal in the state 27-3 where it touches pre-expanded particles. Then, after the pushing plate sinks the pre-expanded particles up to the lower end 26 of the separation wall 25 of the low-pressure vessel 20 sealed with water, the pushing plate rotates from the state 27-4 to the state 27-5 to let most of the sunk pre-expanded particles 8 come to the water surface 23 of the outside of the low-pressure vessel.

By the above-described process where the apparatus shown in FIGS. 4 and 5 are used, 65 to 80% of the foaming agent used for preparing the foaming agent containing particles can be recovered. Accordingly release of foaming agent into the air which causes air pollution, the worsening of working environment and increase in the material cost can be reduced. Furthermore, the pre-expanded particles can be taken out of the low-pressure vessel under the condition that the vessel is sealed. Therefore, the low-pressure vessel is made small and the pre-expanded particles can be prepared continuously, which results in increase in the productivity. And extraneous matters on the surface of the pre-expanded particles can be washed away, since the pre-expanded particles are sunk under water before taking out them.

In addition to the elements and parts used in the Embodiments, other elements and parts can be used in the Embodiments as set forth in the specification to obtain substantially the same results.

The present invention is more particularly described and explained by means of the following Examples. These Examples are intended to illustrate the invention and not be construed to limit the scope of the invention. It is to be understood that various changes and modifications may be made in the invention without departing from the spirit and scope thereof.

EXAMPLE 1

This example was carried out using the apparatus shown in FIG. 1.

A 150 l pressure vessel equipped with a stirrer was charged with 300 parts (75 kg.) of water, 100 parts (25 kg.) of pellets (ellipsoidal form) of ethylenepropylene random copolymer having a density of 0.9 g./cm.$^3$, MI of 9 and an ethylene content of 4.5% by weight, and 0.5 part of powdered basic calcium tertiary phosphate and 0.025 part of sodium dodecylbenzenesulfonate as dispersing agent. The mixture was stirred to give an aqueous dispersion. After introducing 30 parts (7.5 kg.) of dichlorodifluoromethane into the pressure vessel under pressure with stirring the dispersion, the temperature was raised to 136° C. The pressure in the pressure vessel at that time was 26 kg./cm.$^2$ G.

By opening the valve 5 in the release line 14, the aqueous dispersion was released from the pressure vessel into a 1000 l sealed low-pressure vessel through orifices of 3 mm. in diameter bored in an orifice plate with keeping the pressure in the pressure vessel to 30 kg./cm.$^2$ G by feeding nitrogen gas, whereby the pellets were expanded to give pre-expanded particles.

Since dichlorodifluoromethane and the like volatilized from the pellets increased the pressure in the low-pressure vessel during pre-expanding, the valve 12 was opened to keep the pressure in the low-pressure vessel to around atmospheric pressure (0.98 to 1.04 kg./cm.$^2$ absolute). The foaming agent was sent from the low-pressure vessel to a collector due to the differene of inner pressure between the collector and the low-pressure vessel.

When pre-expanding was finished, about 70 l of the aqueous solution and about 800 l of pre-expanded particles existed in the low-pressure vessel and the inner temeperature of the vessel was 25° C. And 4.1 kg. of dichlorodifluoromethane was recovered in the cellector. Then the dichlorodifluoromethane was liquefied by condenser C to be recovered. In the pressure vessel 2.5 kg. of dichlorodifluoromethane remained. It was also recovered by liquefying using a condenser. The amount of dichlorodifluoromethane recovered was totally 6.6 kg. About 0.65 kg. of dichlorodifluoromethane remaining in the low-pressure vessel was also recovered. The amount of dichlorodifluoromethane released into the air was actually about 0.25 kg.

EXAMPLE 2

This example was carried out using the apparatus shown in FIG. 1.

A 125 l pressure vessel equipped with a stirrer was charged with 300 parts (75 kg.) of water, 100 parts (25 kg.) of pellets (ellipsoidal form) of linear low density polyethylene having a density of 0.92 g./cm.$^3$ and MI of 0.8, and 0.5 part of powdered basic calcium tertiary phosphate and 0.025 part of sodium dodecylbenzenesulfonate as dispersing agent. The mixture was stirred to give an aqueous dispersion. After introducing 40 parts (10 kg.) of dichlorodifluoromethane into the pressure vessel under pressure with stirring the dispersion, the temperature was raised to 113° C. The pressure in the pressure vessel at that time was 27.8 kg./cm.$^2$ G.

By opening the valve 5 in the release line 14, the aqueous dispersion was released from the pressure vessel into a 1000 l sealed low-pressure vessel through orifices of 3 mm. in diameter bored in an orifice plate with keeping the pressure in the pressure vessel to 30 kg./cm.$^2$ G by feeding nitrogen gas, whereby the pellets were expanded to give pre-expanded particles.

Since dichlorodifluoromethane and the like volatilized from the pellets increased the pressure in the low-pressure vessel during pre-expanding, the valve 12 was opened to keep the pressure in the low-pressure vessel to around atmosheric pressure (0.98 to 1.04 kg./cm.$^2$ absolute). The foaming agent was sent from the low-pressure vessel to a collector due to the differene of inner pressure between the collector and the low-pressure vessel.

When pre-expanding was finished, about 70 l of the aqueous solution and about 800 l of pre-expanded particles existed in the low-pressure vessel and the inner temeperature of the vessel was 25° C. And 5.6 kg. of dichlorodifluoromethane was recovered in the cellector. Then the dichlorodifluoromethane was liquefied by condenser C to be recovered. In the pressure vessel 3.25 kg. of dichlorodifluoromethane remained. It was also recovered by liquefying using a condenser. The amount of dichlorodifluoromethane recovered was totally 8.85 kg. About 0.65 kg. of dichlorodifluoromethane remaining in the low-pressure vessel was also recovered. The amount of dichlorodifluoromethane released into the air was actually about 0.5 kg.

EXAMPLE 3

This example was carried out using the apparatus shown in FIG. 4.

A 150 l pressure vessel equipped with a stirrer was charged with 300 parts (75 kg.) of water, 100 parts (25 kg.) of pellets (cylindical form) of ethylenepropylene random copolymer having a density of 0.90 g./cm.$^3$, MI of 9 and an ethylene content of 4.5% by weight, and 0.5 part of powdered basic calcium tertiary phosphate and 0.025 part of sodium dodecylbenzenesulfonate as dispersing agent. The mixture was stirred to give an aqueous dispersion. After introducing 30 parts (7.5 kg.) of dichlorodifluoromethane into the pressure vessel under pressure with stirring the dispersion, the temperature was raised to 136° C. The pressure in the pressure vessel at that time was 26 kg./cm.$^2$ G.

By opening the valve 5 in the release line 14, the aqueous dispersion was released from the pressure vessel into a low-pressure vessel sealed with water and having a space volume of 200 l through orifices of 3 mm. in diameter bored in an orifice plate with keeping the pressure in the pressure vessel to 30 kg./cm.$^2$ G by feeding nitrogen gas, whereby the pellets were expanded to give pre-expanded particles.

Since dichlorodifluoromethane and the like volatalized from the pellets increased the pressure in the low-pressure vessel during pre-expanding, the valve 12 provided in the recovery line 11 was opened to keep the pressure in the low-pressure vessel to around atmospheric pressure (0.96 to 1.06 kg./cm.$^2$ absolute).

The generated foaming agent was discharged through the recovery line and collected in a collector like an inversed bowl. The formed pre-expanded particles were sunk under water and taken out of the low-pressure vessel by means of a pushing plate which was set at an angle $\beta$ of 45°.

When pre-expanding was finished, 1.0 kg. and 2.5 kg. of dichlorodifluoromethne in the low-pressure vessel and the pressure vessel was respectively left. And 2.5 kg. of dichlorodifluoromethane in a gaseous state was collected in the collector. Then the dichlorodifluoromethane in the pressure vessel, the low-pressure vessel and the collector was liquefied and recovered. The amount of dichlorodifluoromethane released into the air was actually 1.5 kg. And the amount of the pre-expanded particles obtained was about 800 l.

In the case of this example, fresh water was not used to wash the pre-expanded particles. However, since the pre-expanded particles were sunk under water before taking out them, that brought good effect to wash away extraneous matters on the particles. The amount of extraneous matters (mainly calcium tertiary phosphate) on the pre-expanded particles obtained was 1000 ppm.

EXAMPLE 4

This example was carried out using the apparatus shown in FIG. 4.

A 1000 l pressure vessel equipped with a stirrer was charged with 300 parts (500 kg.) of water, 100 parts (167 kg.) of pellets (cylindical form) of ethylenepropylene random copolymer having a density of 0.90 g./cm.$^3$, MI of 9 and an ethylene content of 4.5% by weight, and 0.5 part of powdered basic calcium tertiary phosphate and 0.025 part of sodium dodecylbenzenesulfonate as dispersing agent. The mixture was stirred to give an aqueous dispersion. After introducing 30 parts (50 kg.) of dichlorodifluoromethane into the pressure vessel under pressure with stirring the dispersion, the temperature was raised to 136° C. The pressure in the pressure vessel at that time was 26 kg./cm.$^2$ G.

By opening the valve 5 in the release line 14, the aqueous dispersion was released from the pressure vessel into a low-pressure vessel sealed with water and having a space volume of 200 l through orifices of 3 mm. in diameter bored in an orifice plate with keeping the pressure in the pressure vessel to 30 kg./cm.$^2$ G by feeding nitrogen gas, whereby the pellets were expanded to give pre-expanded particles.

Since dichlorodifluoromethane and the like volatalized from the pellets increased the pressure in the low-pressure vessel during pre-expanding, the valve 12 provided in the recovery line 11 was opened to keep the pressure in the low-pressure vessel to around atmospheric pressure (0.96 to 1.06 kg./cm.$^2$ absolute).

The generated foaming agent was discharged through the recovery line and collected in a collector like an inversed bowl. The formed pre-expanded particles were sunk under water and taken out of the low-pressure vessel by means of a pushing plate which was set at an angle $\beta$ of 45°.

When pre-expanding was finished, 1.0 kg. and 15 kg. of dichlorodifluoromethne in the low-pressure vessel and the pressure vessel was respectively left. And 24 kg. of dichlorodifluoromethane in a gaseous state was collected in the collector. Then the dichlorodifluoromethane in the pressure vessel, the low-pressure vessel and the collector was liquefied and recovered. The amount of dichlorodifluoromethane released into the air was actually 10 kg. And the amount of the pre-expanded particles obtained was about 5,344 l.

COMPARATIVE EXAMPLE

The same procedures as in Example 3 except that an opened vessel was used as a low pressure vessel, the generated foaming agent was not recovered and released into the air, and the pre-expanded particles were taken out of the vessel without sinking them under water were repeated to obtain pre-expanded particles.

The amount of extraneous matters (mainly calcium tertiary phosphate) attached to the pre-expanded particles obtained was 1,500 ppm.

What we claim is:

1. An apparatus for preparing pre-expanded particles of a thermoplastic resin which comprises a pressure vessel for heating under an elevated pressure an aqueous dispersion comprising thermoplastic resin particles containing a volatile foaming agent and an aqueous liquid; a low pressure vessel for pre-expanding said thermoplastic resin particles; release line means for releasing the aqueous dispersion from the pressure vessel into the low-pressure vessel; said low pressure vessel comprising wall means defining a closed portion and an open portion, and a separation wall; the thermoplastic resin particles containing the volatile foaming agent released through said release line means being pre-expanded and the volatile foaming agent contained in the particles being volatilized within said closed portion, said closed portion and open portion being partitioned by the separation wall which has a lower end spaced from a bottom wall of the low-pressure vessel, and said closed portion and said open portion communicating with each other through a space between the lower end of said separation wall and the bottom wall of said low-pressure vessel; means for maintaining a liquid level in the closed portion and a liquid level in the open portion above said lower end of the separation wall so that a sealed space is formed in the closed portion; means for discharging the volatilized foaming agent from the closed portion of the low-pressure vessel and for controlling the inner pressure within the closed portion at a pressure lower than that in said pressure vessel; and removal means for removing the pre-expanded particles from the closed portion and for forcing the expanded particles below the lower end of said separation wall.

2. The apparatus of claim 1, wherein the pushing plate is a plate having throughholes through which the aqueous fluid is passed but the pre-expanded particles are not passed.

3. The apparatus of claim 1, wherein the pushing plate is arranged so that the plate is inclined downwards at a fixed acute angle wall the separation with standing vertically.

4. The apparatus of claim 1, wherein the pushing plate is arranged so that an angle of the pushing plate with the separation wall is variable.

5. The apparatus of claim 1, wherein said removal means comprises a pushing plate which is located within said closed portion and which is movable up and down along an inner surface of said separation wall so that the pre-expanded particles accumulated on the liquid surface within the closed portion are sunk under the liquid surface therein and forced towards the open portion through the aqueous liquid.

* * * * *